April 13, 1965
E. PITTS ETAL
3,177,719
MEANS FOR INDICATING SMALL CHANGES IN
A PHYSICAL OR CHEMICAL CONDITION
Filed Sept. 7, 1962
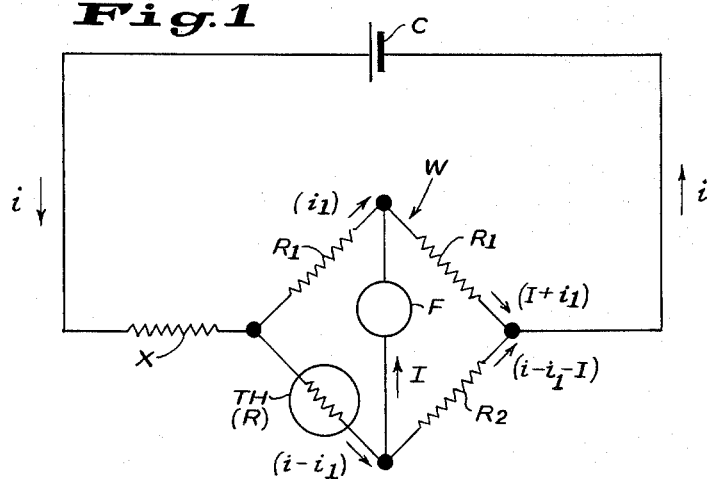
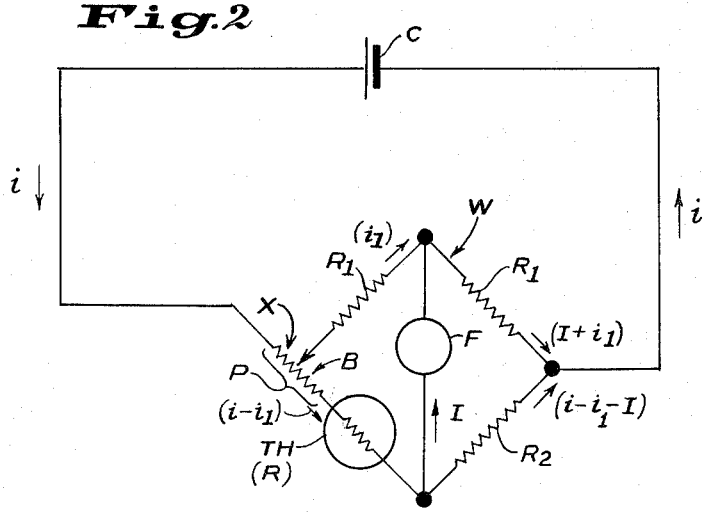
Eric Pitts
Philip T. Priestley
INVENTORS
BY R. Frank Smith
Lloyd F. Seebach
ATTORNEY & AGENT

United States Patent Office 3,177,719
Patented Apr. 13, 1965

3,177,719
MEANS FOR INDICATING SMALL CHANGES IN A PHYSICAL OR CHEMICAL CONDITION
Eric Pitts and Philip Thorpe Priestley, Wealdstone, England, assignors to Eastman Kodak Company, Rochester, N.Y., a corporation of New Jersey
Filed Sept. 7, 1962, Ser. No. 222,166
6 Claims. (Cl. 73—362)

This invention relates to electrical measuring apparatus for measuring changes in physical or chemical conditions and to methods of measuring such changes.

The present invention is particularly concerned with controlling the sensitivity of an electrical apparatus for measuring small changes in a physical or chemical condition which comprises a source of current in series with a Wheatstone bridge having in an arm thereof an element the resistance of which changes non-linearly with said condition.

The primary object of the invention is, therefore, to provide an electrical apparatus for measuring small changes in a physical or chemical condition.

And a further object of the invention is to provide an electrical apparatus which can be used to measure small changes in temperature at different levels of temperature comprising a source of current in series with a Wheatstone bridge having a thermistor in one arm thereof.

Other objects of the invention will appear from the following description, reference being made to the accompanying drawing wherein:

FIG. 1 is a schematic wiring diagram of one form of the invention; and

FIG. 2 is a schematic wiring diagram of another and preferred embodiment of the invention.

In FIG. 1 a source C of current at voltage V is in series with a Wheatstone bridge W and a zero resistance X. The Wheatstone bridge W has in its upper arms equal resistances $R_1$ and in one lower arm a thermistor TH of resistance R and in the other lower arm a resistance $R_2$. A galvanometer F of resistance G joins the upper and lower arms of the bridge W in the usual way. The currents flowing in the circuit are indicated in the usual way, $i$ being the current supplied by the source C, $i_1$ being the current through the first of the resistances $R_1$ and I being the current through the galvanometer F.

The zero resistance X is included in the apparatus of FIG. 1 in order to make the following calculations based on this circuit applicable to an apparatus of the invention in which $X>0$ to be described below.

The resistance R of a thermistor at a temperature T, where T represents degrees measured on the absolute or Kelvin scales, over a range of about 30 degrees Absolute is given by the expression $$R = ae^{b/T}$$

where $a$ and $b$ are constants, so that $$\frac{dR}{dT} = \frac{-bR}{T^2} \neq 0 \text{ since } b \neq 0 \tag{1}$$

These equations for R and $$\frac{dR}{dT}$$

show that $$\frac{dR}{dT}$$

falls in numerical value as T rises.

By applying Kirchhoff's law to the circuit of FIG. 1 it can be shown that $$I = \frac{R_1(R_2-R)V}{L(X+M)} \tag{2}$$

where $L = G(R_1+R_2) + (R+R_1)(G+R_1+R_2)$
and $M = R_1[R_1R_2 + 2R_2G + R(2G+R_1+2R_2)]/L$.

At balance, $R = R_2$ and L becomes $L_0$ and M becomes $M_0$, where $L_0 = 2G(R_1+R_2) + (R_1+R_2)^2$ $$M_0 = \frac{2R_1R_2}{R_1+R_2}$$

When the bridge is just off balance, due to a small change in temperature of the thermistor TH, $L \simeq L_0$ and $M \simeq M_0$. Substitution of $L_0$ and $M_0$ for L and M, respectively, in Equation 2 and differentiation with respect to temperature gives $$\frac{dI}{dT} = \frac{-R_1V}{L_0[X+M_0]} \cdot \frac{dR}{dT} \tag{3}$$

Equation 3 shows that, other factors being constant (including $X=0$), the rate of change of current I through the galvanometer F with the temperature of the thermistor TH, $$\frac{dI}{dT}$$

varies with the rate of change of the resistance of the thermistor with temperature, $$\frac{dR}{dT}$$

Equation 3 is applicable to the apparatus of FIG. 1 with any transducer having a resistance which varies non-linearly with temperature. If a transducer is used which is sensitive to some other condition, C, then $$\frac{dR}{dT}$$

will be replaced by $$\frac{dR}{dC}$$

The apparatus of FIG. 2 is used for measuring small changes of temperature at different levels of temperature by subjecting the thermistor to an initial temperature level, balancing the bridge at that temperature and then allowing the small change in temperature to take place and measuring the resulting out-of-balance current I. To measure a small change in temperature at another temperature level, the bridge is balanced at the new level and after allowing a further small change in temperature to take place the new out-of-balance current is measured. It is apparent that, since $$\frac{dR}{dT}$$

decreases with increasing temperature, the sensitivity of the apparatus, $$\frac{dI}{dT}$$

falls as the temperature of the thermistor rises from one level to another.

If the relationship between R and T of the thermistor (or other element sensitive to temperature) were linear, $$\frac{dR}{dT}$$

in Equation 1 would, of course, be constant and $$\frac{dI}{dT}$$

in Equation 3 would be constant at different levels of temperature.

According to the present invention there is provided a method of measuring small changes in a physical or chemical condition at different levels of said condition which comprises subjecting to different levels of said condition an element the electrical resistance of which varies non-linearly with said condition and which constitutes the resistance or part of the resistance in one arm of a Wheatstone bridge and at each level of said condition balancing said bridge, allowing a small change in said condition to take place and measuring the resulting out-of-balance current, and which further comprises varying the fall in potential across said bridge by varying a resistance in series with said bridge in a positive linear relationship with the rate of change of the resistance of said element with said condition.

According to the present invention there is further provided an apparatus for measuring small changes in a physical or chemical condition which comprises a source of current in series with a Wheatstone bridge, in one arm of which there is an element the electrical resistance of which varies non-linearly with said condition and a variable resistance such that the total resistance in said arm can be maintained constant, and a resistance variable in a positive linear relationship with the rate of change of the resistance of said element with said condition.

In the present invention the non-linear variation of the resistance of the sensitive element with the condition being measured is compensated for, in order to achieve constant sensitivity in the method and apparatus, by introducing a resistance in series with the apparatus and increasing (or decreasing) the resistance with increasing (or decreasing) values in the rate of change of the resistance of the element with the condition. By means of this resistance in series the voltage applied to the bridge is increased as the sensitivity of the element falls and vice versa.

To illustrate this aspect of the present invention reference may be made to Equation 3 above. In that equation $X=0$. According to the present invention $X>0$ and as $$\frac{dR}{dT}$$

increases (or decreases) numerically X is also increased (or decreased) whereby $$\frac{dI}{dT}$$

is maintained numerically constant.

When Equation 3 relates to an apparatus in which the element is a thermistor, $$\frac{-bR}{T^2}$$

may be substituted for $$\frac{dR}{dT}$$

in Equation 3 giving $$\frac{dI}{dT} = \frac{R_1 V}{L_0(X+M_0)} \cdot \frac{bR}{T^2} \quad (4)$$

For certain thermistors $$\frac{R}{T^2}$$

decrease with increasing temperature and in this invention, therefore, X also decreases therewith. Since R also decreases with decrease in $$\frac{R}{T^2}$$

constant sensitivity can be achieved in accordance with this invention in an apparatus illustrated in FIG. 1 by varying X with R from one level of temperature to another.

For other thermistors, R increases with decrease in $$\frac{dR}{dT}$$

in which case X is made to vary negatively with R from one temperature to another.

In this invention there may be used in place of a thermistor any transducer whose resistance changes non-linearly with change in a physical or chemical condition. For example, there may be used a conductivity cell whose resistance varies non-linearly with the concentration of a chemical in solution.

In one embodiment of the present invention the relationship betwen X and R in the apparatus illustrated in FIG. 1 takes the form of $X=R-K$ where K is a constant resistance.

Preferably $K=$ the minimum value of R in the range of temperature in which small changes in temperature are to be measured, so that X is equal to the difference between the actual value of R and its minimum value. One way of achieving this relationship is illustrated by the apparatus shown diagrammatically in FIG. 2 of the accompanying drawing which represents one specific embodiment of the present invention.

Referring to FIG. 2, a source of current C at voltage V is connected in series with a variable resistance X and a Wheatstone bridge W having in the two upper arms equal resistances $R_1$ constituted by two similar preset resistances and in one of the lower arms a resistance $R_2$ which is preset, e.g. a fixed carbon-type resistor (high stability) and in the other an aged thermistor TH having a resistance R at temperature T and in series therewith a balancing resistance B. The sum of the balancing resistance B and the variable resistance X is constant and together they constitute a potentiometer wire P of resistance A, to various points on which the upper arms of the bridge W are connectable. The part of the wire outside the bridge W constitutes resistance X, and the part inside resistance B. A current measuring instrument F, such as a galvanometer of resistance G, is connected between the upper and lower arms in the usual way.

In this preferred embodiment of the invention the maximum value R in the range of temperature in which small changes are to be measured is equal to $R_2$ and the value of A, the resistance of the potentiometer, is equal to the amount by which R varies over the range of temperature. The minimum value of R is then $R_2-A$ and $X=R+A-R_2$.

With the above parameters of the circuit established the value of $R_1$ can be calculated as follows:

Consider the apparatus shown in FIG. 2, the value of $$\frac{dI}{dT}$$

is given in Equation 4 and since $X=A+R-R_2$.

$$\frac{dI}{dT} = \frac{R_1 V b}{L_0} \cdot \frac{R}{T^2(A+R-R_2+M_0)} \quad (5)$$

The condition for constant sensitivity in this apparatus is that $$\frac{dI}{dT}$$

should be independent of temperature throughout the range of values T.

If the sensitivity is the same at two temperatures $T_1$ and $T_2$ at which the resistances of the thermistor TH are $R'$ and $R''$ respectively and V, $R_1$, $R_2$ and G are constant, then under these conditions $$\frac{R'}{T_1^2(A+R'-R_2+M_0)} = \frac{R''}{T_2^2(A+R''-R_2+M_0)} \quad (6)$$

If $R'$ and $R''$ represent the maximum and minimum values of the resistance of the thermistor TH at temperatures $T_1$ and $T_2$ then from above $R'=R_2$ and $A=R'-R''$. After substitution of these values in Equation 6, the value of $M_0$ can be calculated. From above $$M_0 = \frac{2R_1 R_2}{R_1+R_2}$$

and substituting this value of $M_0$, the following equation is obtained from which the value of $R_1$ may be established.

$$\frac{1}{R_1} = \frac{2}{(R'-R'')}\left[\frac{R'}{R''}\left(\frac{T_2}{T_1}\right)^2 - 1\right] \frac{-1}{R'} \quad (7)$$

It is found that if the value of $R_1$ calculated using Equation 6 is adopted, the sensitivity of the apparatus shown in FIG. 2 remains practically constant throughout the range.

Equation 7 was used to set up an apparatus of the present invention as follows:

A Stantel F23 thermistor (made by Standard Telephones and Cables Ltd.) was aged by immersion in hot (35° C.) and cold (10° C.) water alternately until its resistance at a given temperature was constant and then calibrated using an N.P.L. certified 0–50° C. thermometer and a Muirhead Wheatstone bridge. The following values of $R'$ and $R''$ were obtained:

$R' = 2,500$ ohms at $14.00°$ C. $= T_1$
$R'' = 1,463$ ohms at $29.62°$ C. $= T_2$ The value of $T_2$ was chosen so that $R'-R''=1,037$ ohms ($=A$) which was found to be the actual resistance of a potentiometer wire of nominal resistance 1,000 ohms.

Using these values, the values of $a$ and $b$ in the equation $R=ae^{b/T}$ for this thermistor were found to be $b = 2,982°$ Absolute
$a = 0.0775$ ohms and the value of $R_1$ in Equation 7 was found to be $R_1 = 749$ ohms, $R_2$ being given the same value as $R' = 2,500$ ohms.

The actual apparatus was connected up as shown in FIG. 2. The values of $R_1$ and $R_2$ were first calibrated against the Muirhead Wheatstone bridge. The galvanometer F was a Pye Scalamp galvanometer having a resistance $G = 1,308$ ohms and a sensitivity of 0.0556 microamp/cm. ($\mu$a./cm.) on a 15 cm. scale. The source of current C was a dry cell (type Siemens size T), $V = 1.5$ volts.

The thermistor TH was then checked at various temperatures against a Beckman thermometer. The experimental values of sensitivity are shown in Table I.

Table I

| Temp., ° C. | 14.8 | 15.2 | 18.0 | 24.0 | 27.2 | 28.2 |
|---|---|---|---|---|---|---|
| $dI/dT$ ($\mu$a./° C.) | 2.45 | 2.45 | 2.47 | 2.46 | 2.45 | 2.45 |

By means of this apparatus a good constancy of sensitivity over a range of about 14° C. was thus achieved. A full-scale deflection of the galvanometer F corresponded to a temperature change of $$\frac{15 \times 0.0556°\ C.}{2.45} = 0.34°\ C.$$

Temperature changes of the order of $10^{-2}$° C. were therefore easily measured.

The experimentally found value of the sensitivity of the apparatus may be compared with the calculated values as follows:

From Equation 7 two numerically equal values of $$\frac{dI}{dT}$$

at two temperatures $T_1$ and $T_2$ respectively are obtained.

$$\frac{dI}{dT} = \frac{2bVR_1R'}{T_1(2G+R_1+R')[2R_1R'+(R'-R'')(R_1+R')]} \quad (8)$$

$$\frac{dI}{dT} = \frac{bVR''}{2R'T_2^2(2G+R_1+R')} \quad (9)$$

Using the simpler Equation 9 and substituting therein the above-given values of $b$, V, $R''$, $R'$, $T_2$ and G in the apparatus $$\frac{dI}{dT} = 2.43\mu a./°\ C.$$

Thus, the experimental sensitivity of the apparatus varied by less than 1% over the range of temperature employed (14.8° C. to 28.2° C.) and the calculated sensitivity of the apparatus differs only by about 1% from the experimental value.

For some purposes, therefore, Equation 9 or 8 can be used to calculate the sensitivity of the apparatus shown in FIG. 2 and hence the temperature change in ° C. per centimetre deflection in the galvanometer thus obviating time-consuming calibration.

In a modification of the apparatus of the present invention shown in FIG. 2 a thermistor for use over a range from 56° C. to 82° C. was employed. This apparatus was used in a Heitler Ebulliometer (Analyst, vol. 83, 1958, pages 223–9). The apparatus gave a full-scale deflection (14 cm.) for a temperature change of 0.4° C.

In setting up an apparatus of the present invention as shown in FIG. 2 the balancing potentiometer P may be calibrated in ° Absolute thus eliminating the need for a mercury in glass thermometer. If the sensitivity required in the apparatus is predetermined a galvanometer may then be selected to give a suitable deflection per ° C.

The potential fall across the Wheatstone bridge in the present invention may be created by means of a direct current supply as illustrated in FIG. 2 or by an alternating current supply in which case I will be detected by a phase sensitive rectifier which in turn activates a D.C. galvanometer.

Another equation which may be used to calculate $R_1$ for the apparatus illustrated in FIG. 2 is derived from the following equation, which may be obtained graphically or theoretically, $$\frac{dR}{dT} = -\alpha(R-\beta) \quad (10)$$

where $\alpha$ and $\beta$ are independent of T over the working range.

Substituting this value of $$\frac{dR}{dT}$$

in Equation 3 above $$\frac{dI}{dT} = \frac{\alpha R_1 V (R-\beta)}{L_0(A+R-R_2+M_0)} \quad (11)$$

$$\frac{dI}{dT}$$

will be independent of R and hence of T if $$M_0 = R_2 - \beta - A \quad (12)$$

The value of $M_0$ in terms of $R_1$ and $R_2$ is given above; hence $R_1$ can be expressed in terms of $R_2$, $\beta$ and A giving the same values as are obtained from Equation 6.

Substituting the value $A=X+B$ in Equation 12 the equation is obtained $$X = R - (\beta + M_0)$$

showing the X varies in linear positive relation to R.

The apparatus of the present invention is useful in thermometric analysis which involves the measurement of small temperature changes resulting from chemical reaction, e.g. precipitation. It is also useful in determinations of molecular weight by ebullioscopic or cryoscopic methods. The use of a thermistor in the apparatus of the invention for measuring small temperature changes has the advantage that the thermistor has a small thermal capacity. Adjustment of this apparatus is effected by simply varying a single resistance, complicated cyclical procedures are avoided.

We claim:
1. In apparatus for measuring small changes in temperature, the combination comprising:
 (a) a Wheatstone bridge having four arms, with:
  (1) a respective electrical resistance in each of three arms; and
  (2) a thermistor and a balancing electrical resistance in series in the fourth arm, the rate of change of resistance of said thermistor varying substantially linearly with respect to temperature;
 (b) a source of current connected across said bridge;
 (c) a variable electrical resistance in series with said bridge and said source of current that is varied in a linear relationship with the rate of change of the electrical resistance of said thermistor with temperature so that the sum of said variable electrical resistance and said balancing electrical resistance remains substantially constant; and
 (d) a current measuring means connected between one of said three arms and said fourth arm for indicating the change in temperature as a function of the out-of-balance current.

2. Apparatus in accordance with claim 1 wherein each of a pair of said three arms has equal electrical resistance.

3. Apparatus in accordance with claim 1 wherein said variable electrical resistance and said balancing electrical resistance constitute a potentiometer to various points of which one of said three arms is connectable.

4. Apparatus in accordance with claim 1 wherein said current measuring means comprises a galvanometer of constant resistance.

5. Apparatus in accordance with claim 1 wherein the maximum value of the electrical resistance of said thermistor in the temperature range in which small changes are to be measured is substantially equal to said electrical resistance in one of said three arms.

6. Apparatus in accordance with claim 3 wherein the electrical resistance of said potentiometer is substantially equal to the variation in the electrical resistance of said thermistor over the temperature range to be measured.

References Cited in the file of this patent
UNITED STATES PATENTS
2,971,379    Weisheit _____ Feb. 14, 1961

OTHER REFERENCES

Publ.: Science, July 23, 1948, vol. 108, page 90.
Publ.: Journal of Scientific Instruments, June 1951, pages 176–179 (178).
Publ.: Instrument Practice, October 1959, page 1046, vol. 13, No. 10.